United States Patent [19]

Kasuya et al.

[11] Patent Number: 4,922,296

[45] Date of Patent: May 1, 1990

[54] IMAGE REPRODUCING APPARATUS CONTROLLED IN RESPONSE TO DETECTED DENSITY OF AN ORIGINAL IMAGE

[75] Inventors: Yukio Kasuya, Inagi; Masahiro Tomosada; Hideki Adachi, both of Kawasaki, all of Japan

[73] Assignee: Canon Kabushiki Kaisha, Tokyo, Japan

[21] Appl. No.: 309,975

[22] Filed: Feb. 13, 1989

Related U.S. Application Data

[63] Continuation of Ser. No. 62,381, Jun. 15, 1987, abandoned, which is a continuation of Ser. No. 582,881, Feb. 23, 1984, abandoned.

[30] Foreign Application Priority Data

| | | | |
|---|---|---|---|
| Feb. 28, 1983 | [JP] | Japan | 58-33219 |
| Feb. 28, 1983 | [JP] | Japan | 58-33220 |
| Feb. 28, 1983 | [JP] | Japan | 58-33221 |
| Feb. 28, 1983 | [JP] | Japan | 58-33222 |
| Feb. 28, 1983 | [JP] | Japan | 58-33223 |
| Feb. 28, 1983 | [JP] | Japan | 58-33224 |
| Feb. 28, 1983 | [JP] | Japan | 58-33225 |

[51] Int. Cl.[5] .................... G03G 15/00; G03G 15/04; G03B 27/80

[52] U.S. Cl. .................................. 355/208; 355/214; 355/233; 355/69; 355/243

[58] Field of Search ............ 355/8, 14 R, 14 D, 14 E, 355/68, 69, 55, 203-208, 214, 233-234, 243

[56] References Cited

U.S. PATENT DOCUMENTS

| | | | |
|---|---|---|---|
| 4,087,171 | 5/1978 | Yano | 355/14 D |
| 4,099,860 | 7/1978 | Connin | 355/14 R X |
| 4,124,295 | 11/1978 | Gardiner | 355/68 |
| 4,153,364 | 5/1979 | Suzuki et al. | 355/14 D X |
| 4,183,656 | 1/1980 | Ishihara et al. | 355/14 E X |
| 4,200,391 | 4/1980 | Sakamoto et al. | 355/14 D X |
| 4,217,052 | 12/1980 | Tani et al. | 355/8 |
| 4,239,374 | 12/1980 | Tatsumi et al. | 355/14 E |
| 4,306,804 | 12/1981 | Sakamoto et al. | 355/14 D X |
| 4,315,685 | 2/1982 | Inuzuka et al. | 355/14 R |
| 4,344,699 | 8/1982 | McIntosh | 355/68 X |
| 4,352,553 | 10/1982 | Hirahara | 355/14 R Y |

*Primary Examiner*—Joan H. Pendegrass
*Attorney, Agent, or Firm*—Fitzpatrick Cella Harper & Scinto

[57] ABSTRACT

An image reproducing apparatus with or without an ADF has an optical system for scanning an original, a developing unit, a fixing unit, a differential amplifier, and a microcomputer. Original image density can be measured properly in any mode of the apparatus. The image is reproduced to have optimal density by a lamp control voltage from the differential amplifier. Toner deficiency or the like can be indicated with a few number or displays and/or indicators. Upon detection of toner deficiency or the like, the current copying cycle is completed first and the apparatus is stopped. The copying operation can be resumed after the toner deficiency or the like is eliminated.

29 Claims, 12 Drawing Sheets

FIG. 2
| | COPY MACHINE | ADF |
|---|---|---|
| COPY START | ← | |
| ADF START | → | |
FIG. 3
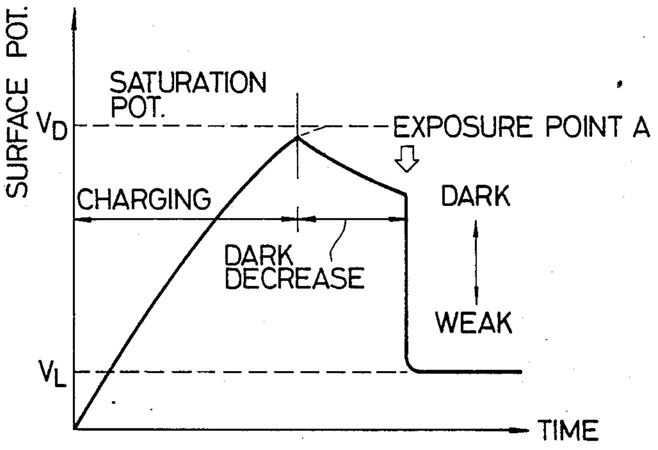
FIG. 4
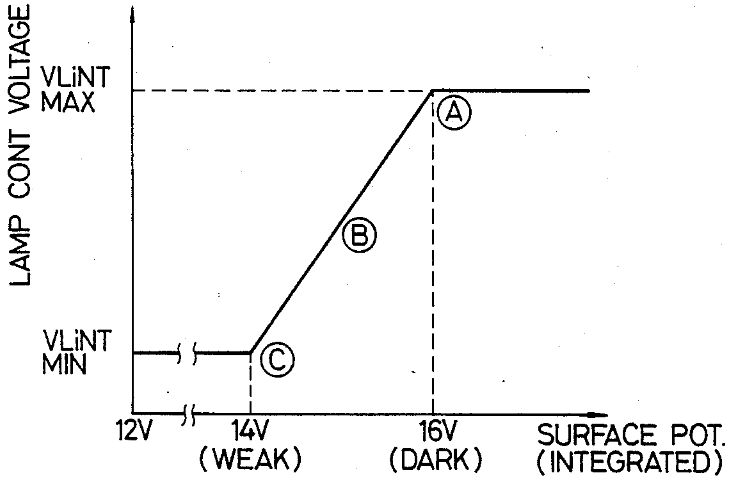

| | V1 | V2 | V3 | V4 | VLiNT |
|---|---|---|---|---|---|
| DARK | 10V | 16V | 4V | 4V | 16V |
| WEAK | 12V | 12V | 12V | 8V | 10V |

IMAGE REPRODUCING APPARATUS CONTROLLED IN RESPONSE TO DETECTED DENSITY OF AN ORIGINAL IMAGE

This application is a continuation of application Ser. No. 07/062,381 filed June 15, 1987, now abandoned, which was a continuation of application Ser. No. 06/582,881 filed Feb. 23, 1984, now abandoned.

BACKGROUND OF THE INVENTION

1. Field of the Invention

The present invention relates to an image reproducing apparatus such as a copying machine.

2. Description of the Prior Art

A copying machine has been proposed recently to detect a density of an original image optically or electrically (based on potential levels) and to reproduce an image with an appropriate density (to be referred to as AE hereinafter).

In an apparatus of this type, an optical system is moved in the forward direction when prescanning for AE is performed. During this forward movement of the optical image, AE measurement is performed and the density of the image is read. The read density is held, and the moving direction of the optical system is inverted from the forward direction to the backward direction at a home position (to be referred to as home position B hereinafter) which is different from a home position (to be referred to as home position A hereinafter) in the steady state. The optical system then returns to the home position A. The amount of light emitted from the original exposure lamp is controlled in accordance with the detected original density obtained by the AE measurement and the desired image is formed.

However, in a copying machine with an ADF (Automatic Document Feeder), prescanning for the AE measurement cannot be performed while original sheets are being fed and discharged by the ADF.

Accordingly, sheet feed and discharge by the ADF or prescanning for AE cause a decrease in the copying speed.

In copying different sizes, the scanning speed or scanning stroke is changed. In such cases, when AE control is performed in accordance with the measured original density, the image quality becomes different from that expected.

When AE control is performed with high precision in accordance with the measured original density, the reproduced image frequently becomes too dark or too weak (bright).

When the original density is measured, the previous measurement must be reset (cleared). However, if such resetting is performed at the beginning of the copying operation, an erroneous signal is stored and the control precision is degraded. Furthermore, if this resetting is performed too frequently, it may even be performed during interruption of the copying operation, thus further lowering the copying speed.

Although it is desired to warn or display conditions associated with image reproduction, this also requires a great number of indicators and/or displays and degrades the outer appearance of the control console of the copying machine.

Accordingly, it is an object of the present invention to provide an image reproducing apparatus which is free from such conventional drawbacks.

It is another object of the present invention to provide an image reproducing apparatus which is free from time loss due to image density control.

It is still another object of the present invention to provide an image reproducing apparatus which is capable of optimal image density measurement.

It is still another object of the present invention to provide an image reproducing apparatus which is capable of reproducing a stable image of optimal density even if the copying mode is changed from the normal size to in a different size.

It is still another object of the present invention to provide an image reproducing apparatus in which the copying speed is not decreased even if an additional device such as an ADF is added.

It is still another object of the present invention to provide an image reproducing apparatus which is capable of providing nonoptimal warning displays such as image reproducing conditions with a fewer number of displays and/or indicators. The above and other objects and advantages of the present invention will become apparent from the following description when taken in conjunction with the accompanying drawings.

SUMMARY OF THE INVENTION

In accordance with a preferred embodiment of the invention there is provided an image reproducing apparatus having an optical system for scanning an original, a developing unit, a fixing unit, a differential amplifier, and a microcomputer, wherein the image density of an original can be measured properly in any mode of the apparatus. The image is reproduced to have optimal density by a lamp control voltage from the differential amplifier, and a toner deficiency or the like can be indicated with a small number of displays and/or indicators. Also, upon detection of a toner deficiency or the like, the copying cycle in progress is completed before the apparatus is stopped.

BRIEF DESCRIPTION OF THE DRAWINGS

FIG. 2 is a chart for explaining a control signal;

FIGS. 3 and 4 are graphs showing potential characteristics;

FIG. 5-1 is an AE control circuit;

FIG. 5-2 is a chart showing outputs of the circuit shown in FIG. 5-1;

FIGS. 7-1 to 7-5 are flow charts for explaining the control sequence of the apparatus of the present invention;

DETAILED DESCRIPTION OF THE PREFERRED EMBODIMENT

Figure 1:
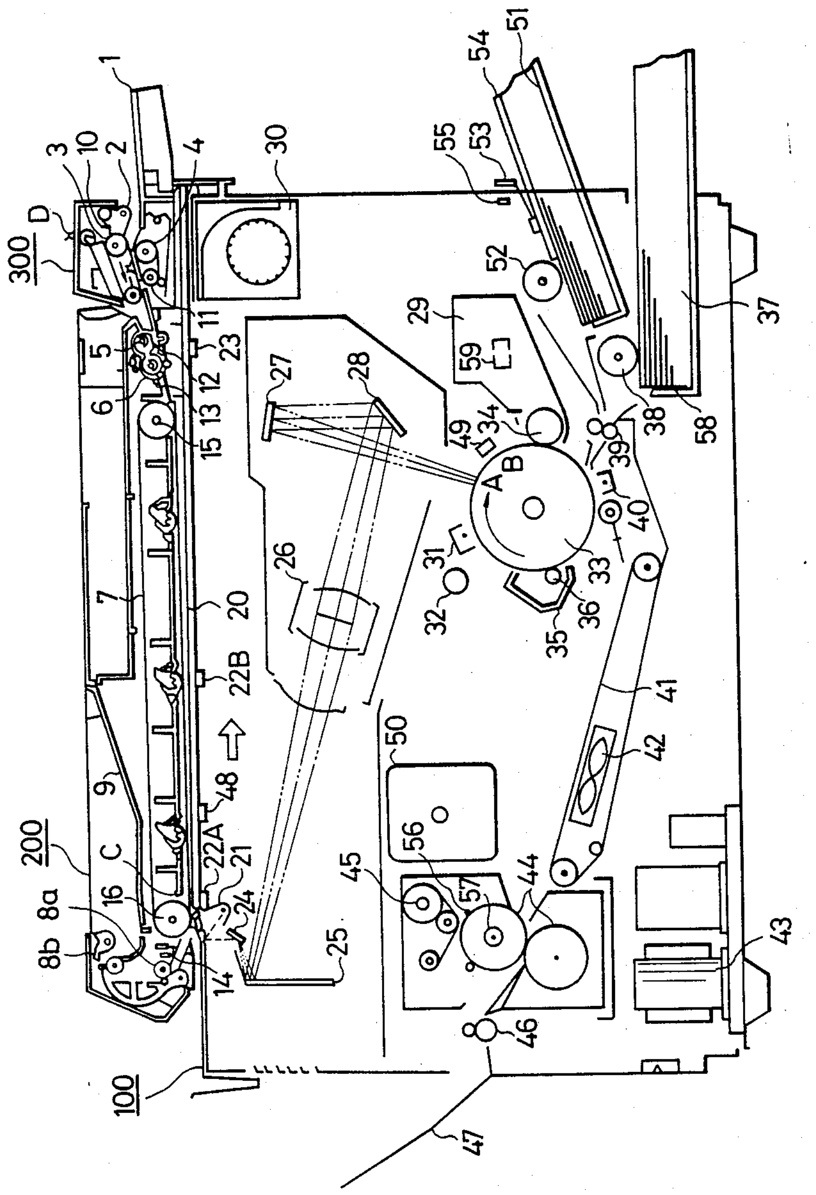
FIG. 1 is a sectional view of a copying machine to which the present invention may be applied.

FIG. 1 is a sectional view of a copying apparatus to which an embodiment of the present invention is applied.

Figures 1, 2, 5:
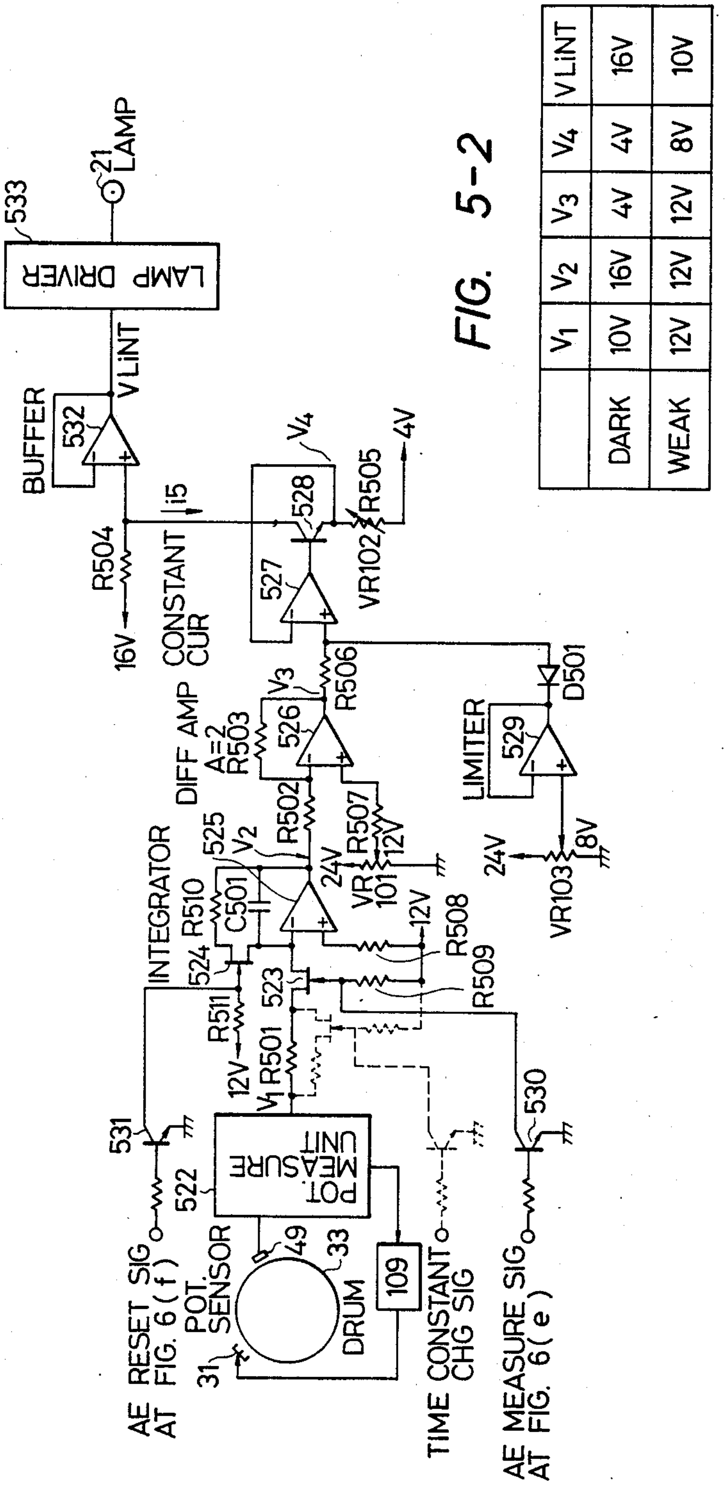

An external device (ADF in this case) 200 is connected to a copying machine 100 having a plurality of image reproduction elements for operation to perform an imaging process and is coupled by a signal shown in FIG. 2.

The imaging process is performed by a photosensitive drum 33 which is driven in the direction indicated by the arrow. A main motor 50 drives all the moving parts including the drum 33, and to operational elements including a fixer 44, a conveyor 41, a sheet feed roller 38, and an optical system including an original illumination lamp 21 through chains (not shown).

A high-voltage charger 31 charges the surface of the photosensitive drum 33. An electrostatic latent image is formed upon exposure at position A on the photosensitive drum 33. Toner is applied by a developing roller 34 in a developer 29. A toner image thus formed is transferred onto a transfer sheet by a transfer charger 40. Prior to such image transfer, a transfer sheet is picked up by the sheet feed roller 38 from a cassette 37 at a time such that the leading end of the toner image coincides with that of the transfer sheet, and the transfer sheet is fed by register rollers 39.

The original exposure is performed by the original illumination lamp 21. The optical system including the original illumination lamp 21 scans the original in the direction indicated by the arrow so as to expose the position A of the photosensitive drum 33 through reflecting mirrors 24, 25, 27 and 28 and a lens 26. A register sensor 48 operates such that the register rollers 39 start rotating thereby aligning the leading end of the image with that of the transfer sheet. Of inversion sensors 22A and 22B and 23, 22B provides the home position B of prescanning in the AE measurement and also an optical system inversion position for a cassette 37 of small size (e.g., B5, A4 or the like). 23 is the optical inversion position for a cassette 37 of large size (e.g., A3).

The photosensitive drum 33 from which the image has been transferred onto the transfer sheet is cleaned with a cleaner brush 36 of a cleaner unit 35, and is electrostatically cleaned by an eraser 32. The photosensitive drum 33 is then ready for the next charging (image forming) operation. Meanwhile, the transfer sheet onto which the toner image is transferred is separated from the photosensitive drum 33 and is conveyed by the conveyor 41 to the fixer.

The transfer sheet is drawn downward by suction from a suction fan 42 while it is being conveyed. The image on the transfer sheet is fixed by a fixing roller 44, and the produced copy is discharged by discharge rollers 46 onto a discharge tray 47. A web motor 45 takes up a web for cleaning the fixing roller 44. The apparatus further includes a power supply transformer 43, and a cooling fan 30 for radiating the heat of the illumination lamp 21.

The names and operations of the respective parts of the ADF will now be described. When an original is placed on an original tray 1 by the operator, an AF original sensor 10 detects it. AF (automatic feeder) is one of the mechanisms of the ADF and corresponds to an AF unit 300 shown in FIG. 1 which together with a DF document feeder unit 200 provide a single function and constitute the ADF. When an ADF start switch D at the console/display is depressed, a pickup roller 2 is lowered. After a predetermined period of time, an AF motor (not shown) is driven to pick up the uppermost of the stacked original sheets. When the leading end of the picked up original conveyed between separation belts 3 and 4 driven in the direction indicated by the arrow is detected by an AF timing sensor 11, the pickup roller 2 is moved upward. The original is then conveyed from the AF unit 300 to the DF unit 200. When the leading end of the original is detected by a DF original sensor 12, the separation belt 4 is moved downward stopping the operation of the separation belts 3 and 4. After a predetermined period of time, the AF unit also stops operating.

In the DF unit, when the DF original sensor 12 detects the leading end of the original, a press roller 5 is moved downward to urge the original. The DF motor (not shown) is then driven to rotate the DF unit press roller 5, a convey roller 6, a belt drive roller 15, a turn roller 16, and a discharge roller 8. Upon this drive operation, the original starts to be conveyed at a speed faster than that in the AF unit.

When the original passes through the conveyor roller 6, the leading end of the original is detected by an inlet sensor 13. At this time, clock pulses from a clock generator (not shown) synchronous with the DF motor start to be counted. The press roller 5 is moved upward. The original is then guided to a position between a belt 7 and an original glass platen 20 and is conveyed by the belt 7.

When the trailing end of the original is detected by the inlet sensor 13, the next original, if there is one, beings to be conveyed in the manner described above. This next original is waiting at the position corresponding to the DF original sensor 12. When the number of pulses generated by the clock generator reaches a predetermined number, the DF motor is stopped and the ADF sends a COPY START signal to the copying machine.

A potential sensor 49 measures the surface potential of the photosensitive drum 33. The surface potential is as shown in FIG. 3. More specifically, the surface potential of the photosensitive drum 33 is charged to V0 by a corona discharge. This surface potential causes dark attenuation before the image portion of the photosensitive drum 33 reaches the exposure point A. When the image of the photosensitive drum 33 reaches the exposure point A, the original is illuminated with light from the original illumination lamp 21 and reflected light forms an image on the photosensitive drum 33 in accordance with the density of the original. When the density of the original is weak (bright), the amount of reflected light is great, and the surface potential is decreased to VL, as shown in FIG. 3.

Figure 6:
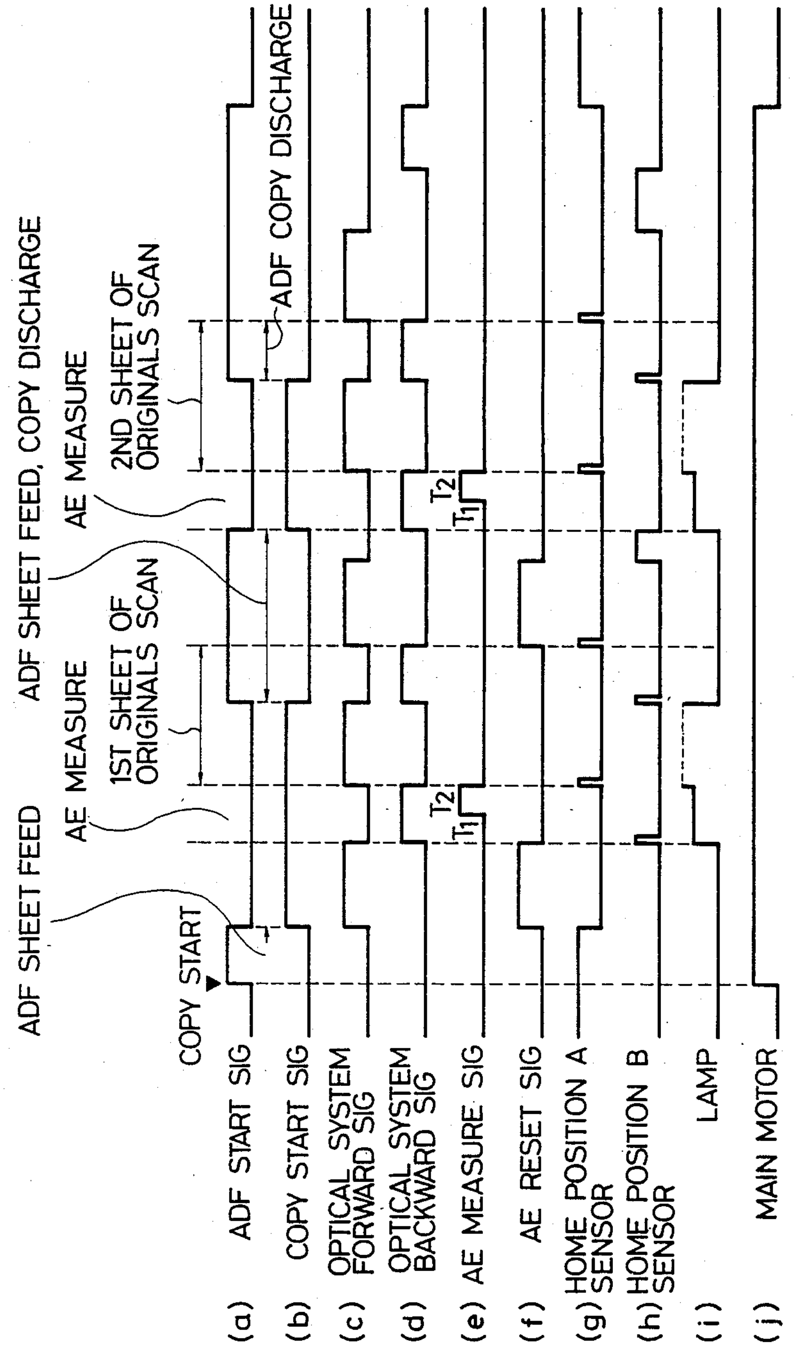
FIG. 6 is a timing chart showing the operation of the apparatus of the present invention.

Conversely, when the density of the original is dark, the amount of reflected light is small, and the surface potential is not lowered much. By reading the surface potential of the photosensitive drum 33, the density of the original can be discriminated. The circuit portion involved from the measurement of the drum surface potential to the light amount control of the original illumination lamp is shown in FIG. 5-1. Referring to FIG. 5-1, an operational amplifier Q525, a resistor R501, and a capacitor C501 together constitute an integrator in which capacitor C501 stores a charge thereby constituting memory means. The integrator integrates (accumulates) the drum surface potential resulting in a surface potential curve as shown in FIG. 4 which provides a lamp control voltage VLiNT to a driver 533 for controlling the amount of light to be emitted from the original illumination lamp 21. A transistor 530 and an FET 523 constitute a gate circuit which receives a signal, as shown in FIG. 6(*e*). A transistor 531 and an FET 524 constitute a reset circuit for resetting the charge on the capacitor C501. The reset circuit receives a signal, as shown in FIG. 6(*f*).

The AE unit used in the embodiment shown in FIG. 4 has two limiter functions of VLiNTmax and VLiNTmin. These two functions are realized by a differential amplifier 526, constant current circuits 527 and 528, a limiter 529, and a buffer element 532. As shown in FIG. 5-2, a drum surface potential output V1 becomes 10 V when the original density is dark and becomes 12 V when the original density is weak. A corresponding integrator output V2 becomes 16 V when the original density is dark and is 12 V when the original density is weak. A gain A of the differential amplifier 526 is 2. When the original density is darker than a predetermined level, for example, when V2=16 V, the output from the differential amplifier 526 becomes 4V. A current 15 flowing in the constant current circuits becomes 0 A. VLiNT decreases the original image density from the detected level (renders it weaker), and the original illumination lamp is lit so as to give an optimal exposure.

Conversely, when the original is weak, and if the drum surface potential V1 is 12 V as shown in FIG. 5-2, which is higher than 11 V, the output from the differential amplifier 526 is limited to 8 V by the limiter 529. An output V4 becomes 8 V accordingly. Therefore, VLiNT=10 V. When the drum surface potential falls between 10 V and 11 V, it is given by the following curve having the slope shown in FIG. 4:

$$VLiNT = 16 - R504\,(V4 - 4)/R505 \qquad (1)$$

As described above, when upper and lower limit limiters are provided, the copy image will not have an excessively dark or bright density.

As will be described later, in this embodiment, the rotating speed of the photosensitive drum 33 is varied. This is performed by switching the rotating speed of the main motor 50 between high- and low-speeds. When equal-size copying is to be performed, high-speed drive is selected. When copying in a reduced or enlarged size is to be performed, low-speed drive is selected. The circuit portion indicated by the broken line shown in FIG. 5-1 is incorporated to control the time constant of the integrator. A resistor is connected in parallel with the resistor R501.

Figure 8:
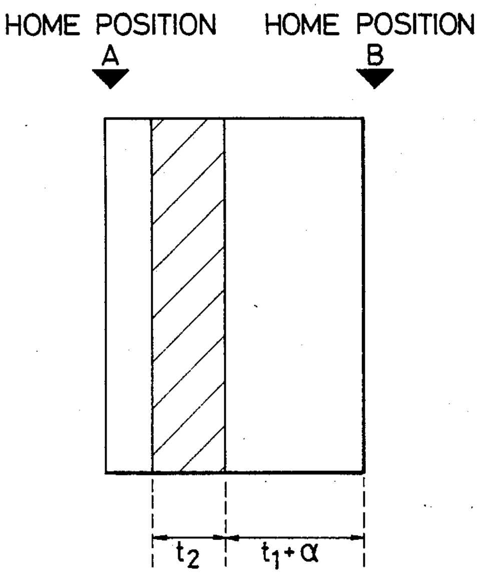
FIG. 8 is a diagram showing a density measuring region.

In order that the image indicated by the hatched region of the original shown in FIG. 8 is read as the process speed is changed, AE measurement time t2 must be kept variable. The details of this operation will be described later.

In this manner, the density of the specified region of the image shown in FIG. 8 is read, and the amount of light to be emitted from the original illumination lamp for image formation, is controlled accordingly.

In order to provide flexible control for originals of various sizes, upper and lower limit limiters are provided for adjustment by three methods.

Referring to FIG. 5-1, the first method is level shift by the differential amplifier 526. This is performed by means of a variable resistor VR101. The second method is adjustment of the density control slope. This is performed by means of a resistor R505 (to be regarded as a variable resistor VR102). The slope is given by equation (1) above. The third method uses a variable resistor VR103 in the limiter 529. This corresponds to point Ⓒ in FIG. 4. The adjustment is described with reference to FIG. 4. Point Ⓐ is determined by the first method. The slope of Ⓑ is determined by the second method, and the point Ⓒ is determined by the third method to complete the adjustment.

The drum surface potential is measured by means of a sensor 49 prior to measurement of the original density and is controlled through a high-voltage transformer 109 shown in FIG. 5-1. When a main power switch of the copying machine is turned on, the drum is driven for a predetermined period of time during the waiting time for the copy start key to be depressed or in the standby time. The primary charger (high voltage charger) 31 is operated, the surface potential is brought to a predetermined level by the sensor, and the copying machine is set in the standard state. In this case, a standard white board is disposed at the home position 22A (FIG. 1), and the lamp 21 is turned on at level 5 of a slide lever (copy density selection lever) 907. The potential of the latent image formed on the photosensitive drum 33 by the reflected light from the white board is detected by the sensor 49. The amount of light to be emitted from the lamp 21 is controlled in accordance with the detected potential, and the weak potential can be converged to a predetermined level. The weak potential can be stabilized when the charger 31 is controlled under the condition wherein the lamp 21 is turned off.

The amount of light emitted from the lamp during the AE measurement shown in FIG. 6 corresponds to the specific amount corresponding to the level 5 of the lever 907 but may be a value close thereto. When exposure scanning is started, light emitted is set to be a preset amount by the lever 907.

Figures 2, 7:
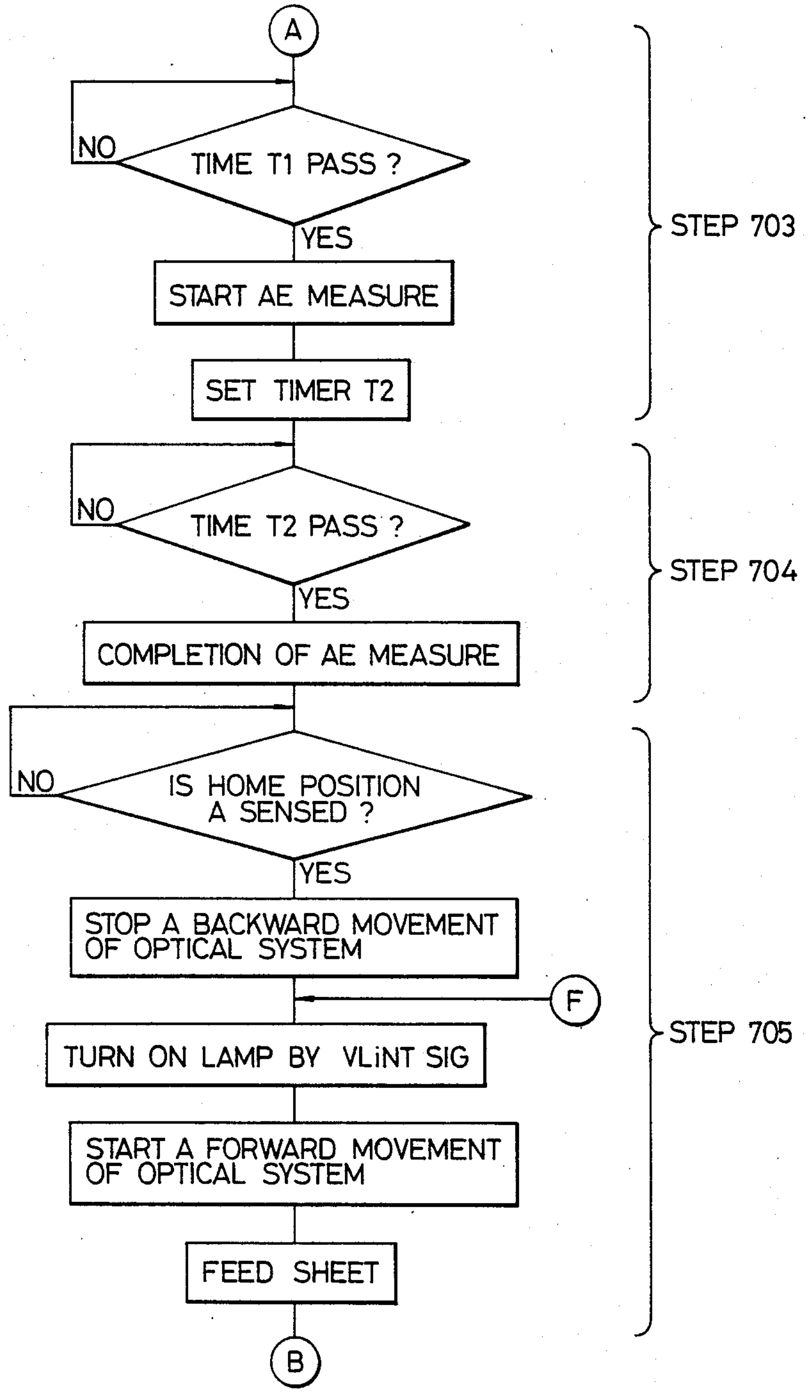
Figures 1, 7:
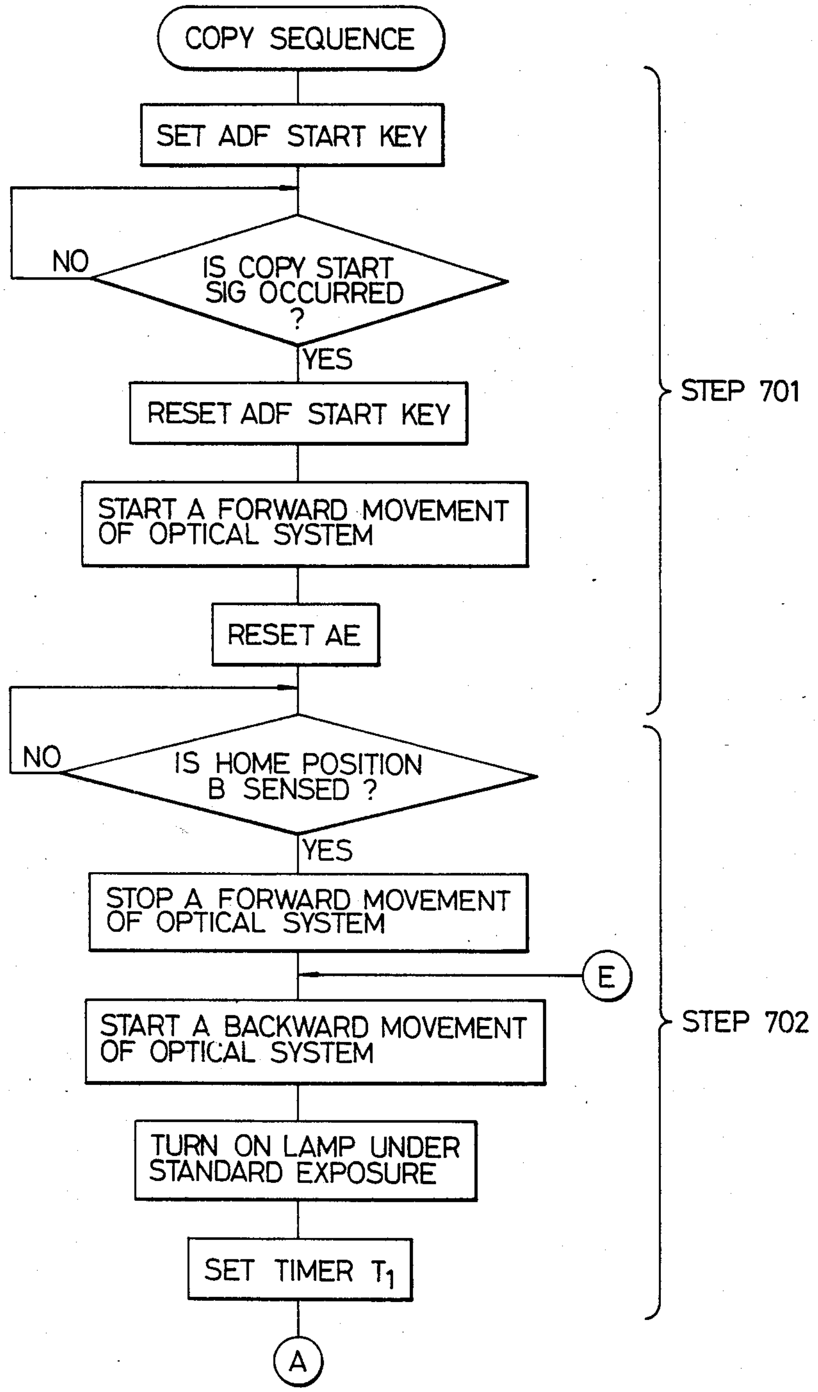
Figures 3, 7:
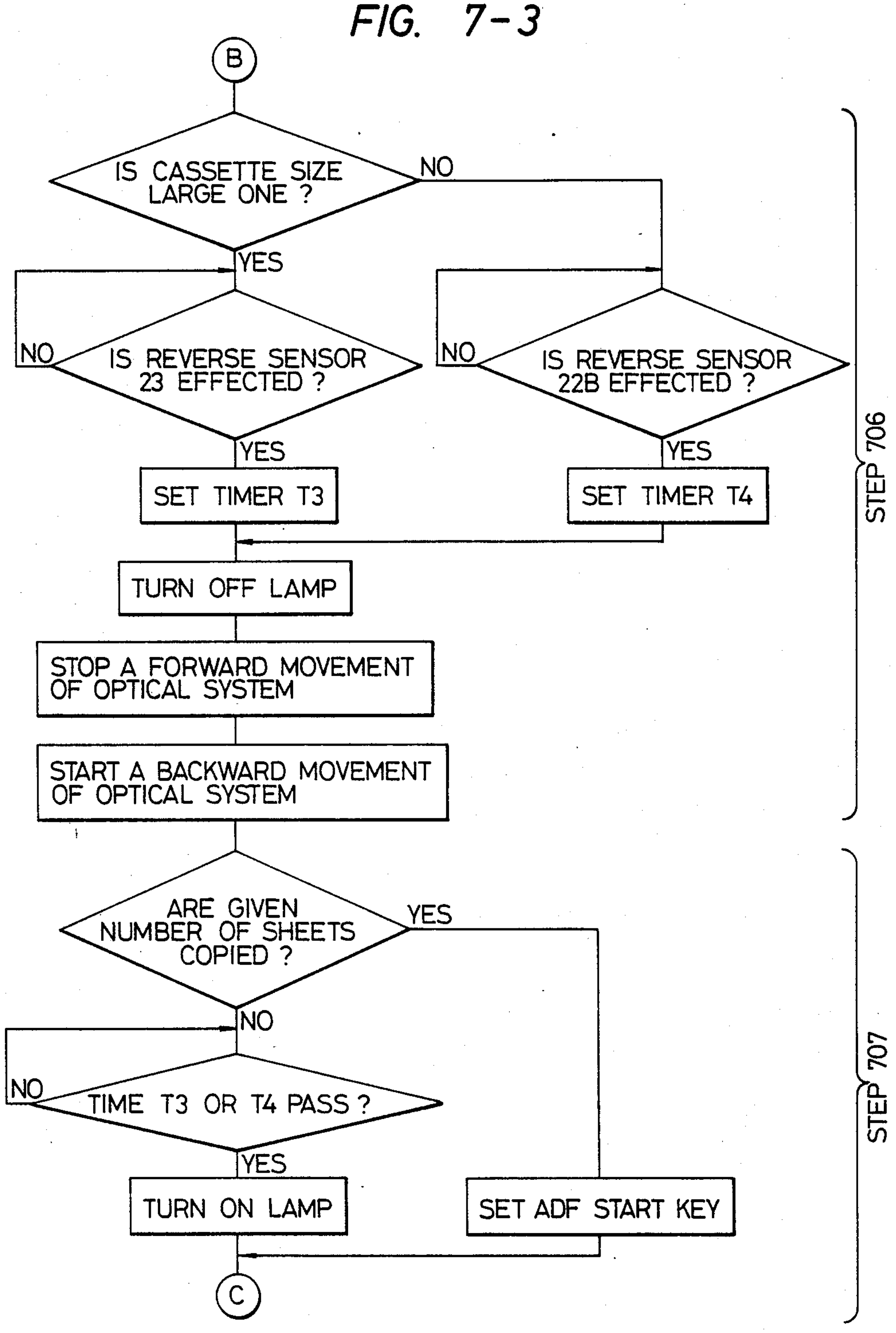
Figures 4, 7:
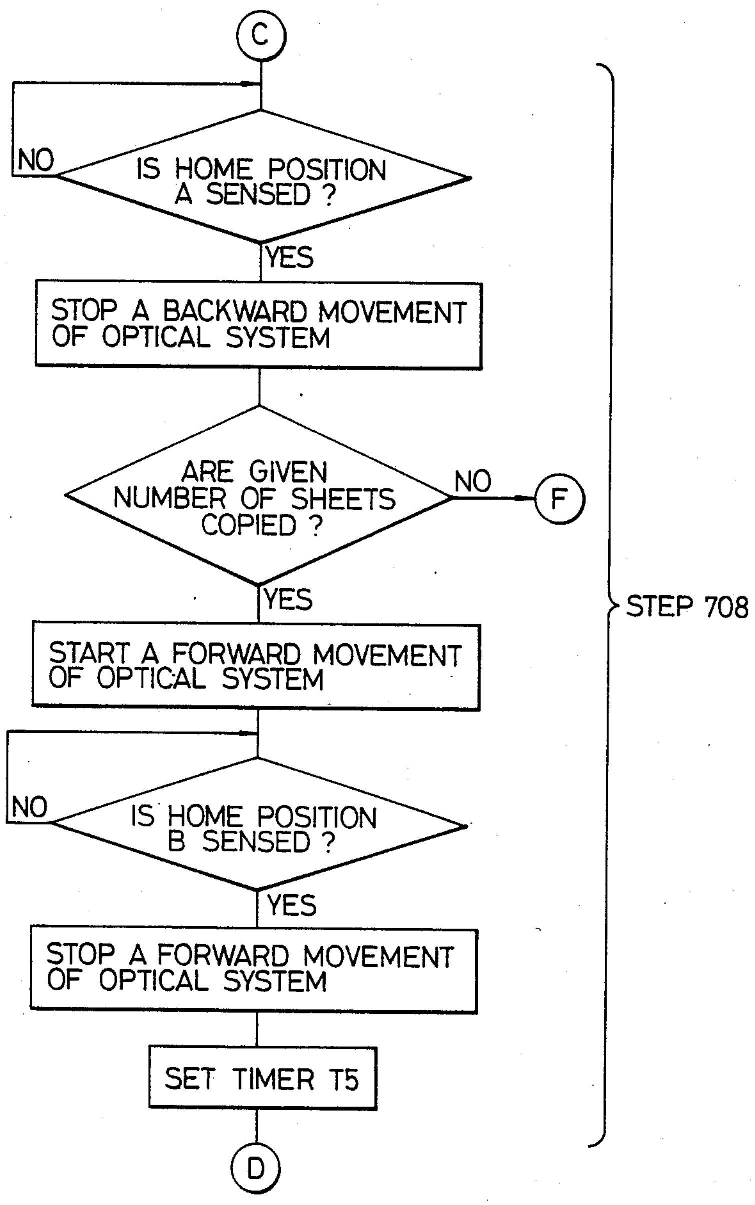
Figures 5, 7:
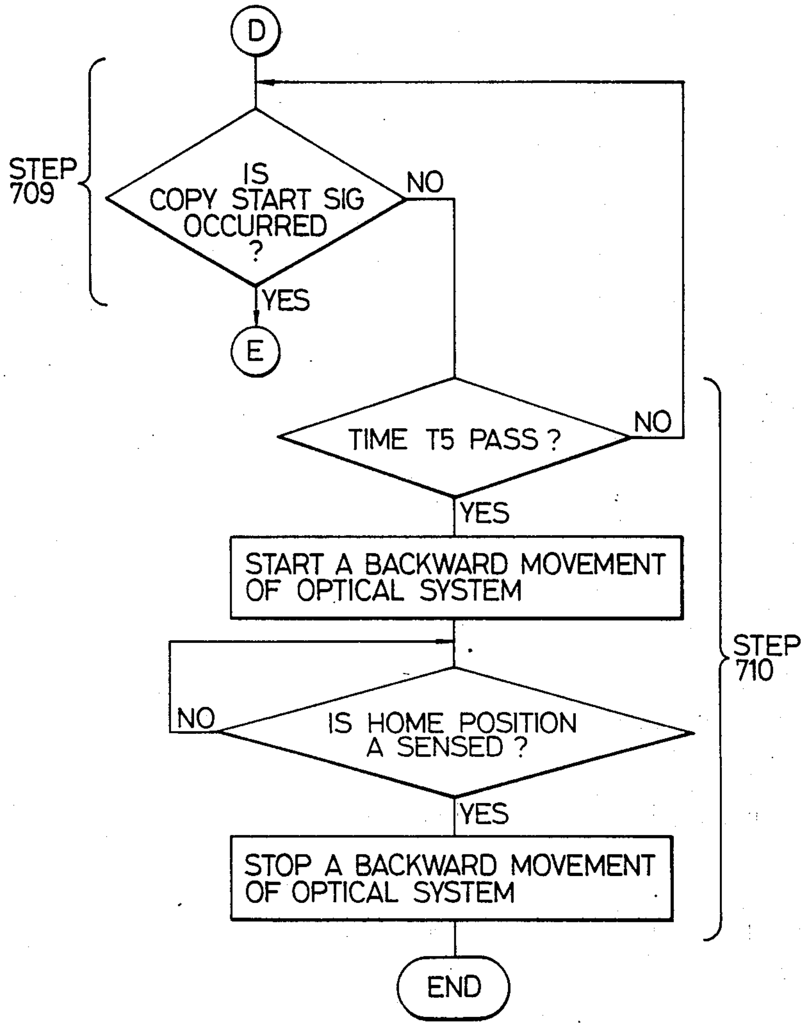

FIGS. 6, 7 and 8 show the timing and flow charts of the respective units of the embodiment of the present invention. A description will be made in the order of the mode of operation of the ADF when two copies of an original are produced using an ADF and the subsequent copying sequence of the copying machine.

After the operator sets an original on the original tray 1 in the AF unit in the manner described above, the depresses the ADF start switch to turn on the ADF. The uppermost sheet of the original is picked up and when the picked up original reaches a predetermined position by the DF unit (point Ⓒ in FIG. 1), the ADF sends a COPY START signal to the copying machine. The process corresponds to step 701 in FIG. 7-1. In response to the COPY START signal, the copying machine starts the copying operation.

First, the ADF START signal is reset so that the ADF may not operate erroneously. The ADF START signal remains reset until the copying operation end state is inverted. Since AE measurement is to be performed, the forward movement of the optical system is started. In order to reset the peak hold circuit of the AE measure circuit shown in FIG. 5-1 for AE measurement, the AE reset signal shown in FIG. 6(*f*) is generated. The AE reset signal is generated before the copying operation is started. When the copying operation is to be resumed after interruption due to a deficiency in toner or transfer sheets, the reset circuit does not operate. Accordingly, in this case of copying restart operation, AE measurement is not performed. The optical system which has started its forward movement continues to move in the forward direction until it detects the home position B, as in step 702. When the optical system detects the home position B, the forward movement thereof is changed to the backward movement, and the original illumination lamp 21 is lit to emit light of standard brightness.

This is shown in FIGS. 6(*h*) and 6(*i*). The standard brightness does not vary for each AE measurement, but remains constant. In this case, the home position B corresponds to 22B in FIG. 1. The position B can be shifted as needed. The timing of the charger 3 is controlled substantially in synchronism with the timing of turning on the original illumination lamp 21. The charger 40 is cleared at the timing of the transfer operation. Accordingly, when the latent image for the AE measurement passes through the charger 40, the charger 40 is OFF.

After a time T1 from the start of the backward movement of the optical system, an AE measurement signal as shown in FIG. 6(*e*) is generated to start AE measurement. This corresponds to step 703 shown in FIG. 7-2. In step 704, after time T2, the AE measurement signal is disabled. This is for the purpose of measuring the intensity of the hatched portion shown in FIG. 8. "α" is added to t1 in FIG. 8 for correcting the geometrical distance from the exposure point A shown in FIG. 1 and the measuring point B of the surface potential. In this manner, the duration of the AE measurement signal is determined by the times T1 and T2 from the start of the backward movement of the optical system. When the main motor 50 provides the power for driving all the moving parts as in the case of this embodiment, if the rotating speed of the main motor is changed, the speed of the backward movement of the optical system is also changed. This also affects the duration of the AE measurement signal. Assume that there are two motor speeds, high and low. Then, when the original density of the hatched portion as shown in FIG. 8 is to be constantly read, an AE measurement time t2 is kept short when the motor is driven at the high speed, and the time t2 is kept long when the motor is driven at the low speed. The AE measurement time is therefore a parameter for calculating the original density level. The AE measurement signal is supplied to an "AE measure" terminal of the AE measure circuit as shown in FIG. 5-1. The discrimination between the high or low speed drive is made by software. In this embodiment, high speed drive is performed in the equal size copying operation, and low speed drive is performed in copying operation in reduced or enlarged size. In step 705, it is discriminated if the optical system during the backward movement has reached the home position A. If the optical system has reached the home position A, the amount of light to be emitted by the original illumination lamp is determined in accordance with the signal VLiNT corresponding to the image density measured by the AE measurement. After the original illumination lamp is turned on, the optical system is moved forward for original exposure and latent image formation. A transfer paper sheet is fed at this time. Step 706 and thereafter are the same as those of the general copying sequence. However, the position of inverting the moving direction of the optical system is different according to whether the cassette 37 shown in FIG. 1 is of large or small size. When the selected copy size is the large size, the moving direction of the optical system is changed from forward to backward at the position of the inversion sensor 23. When the selected copy size is the small size, the inversion is made at the inversion sensor 22B.

The inversion sensor 22B is also a home position, as has been described above. In step 707, it is discriminated if the number of produced copies has reached a preset copy number. If the number of produced copies has reached this preset copy number, an ADF START signal is supplied to the ADF so that the ADF feeds another original sheet.

In response to the ADF START signal, the ADF starts the sheet feed and discharge operation of the original. In this embodiment, as shown in FIG. 6, a single copy is to be produced for each of the two original sheets. Accordingly, in step 707, the ADF START signal is produced immediately. If the preset copy number is more than one sheet, the halogen lamp is turned on for the next copying cycle. In this case the halogen lamp is turned on earlier than the actual exposure time, in consideration of the rise time of the halogen lamp or the like. However, the time for which the halogen lamp is turned on after the optical system is inverted at the inversion sensor 22A or 22B is different. Accordingly, a timer present time T3 or T4 is selected in accordance with the cassette size in step 706 so as to solve this problem.

In step 708, it is checked if the number of produced copies has reached the present copy number. If NO in step 708, the flow jumps to a node Ⓕ for performing another copying cycle. However, if YES in step 708, the forward movement of the optical system is started, and the optical system is directed toward the home position B. When the optical system reaches the home position B, the forward movement of the optical system is stopped, and the COPY START signal from the ADF is referred to. When the COPY START signal is obtained within a time T5 (step 709), it is determined that the feed and discharge of the original have been completed in the ADF. Then, the flow jumps to a node Ⓔ for resuming the backward movement of the optical system for AE measurement. If it is determined that the COPY START signal is not received in the time T5, the backward movement of the optical system is started in step 710 so as to return the optical system from the home position B to the home position A. When the optical system returns to the home position A, the backward movement of the optical system is stopped and the series of copying sequence is terminated.

When the different size copying measurement time t2 (FIG. 6 or 8) is prolonged, the time constant for integration of the AE circuit shown in FIG. 5-1 is increased to the integrated amount in the equal size copying. The time constant for integration is therefore a parameter for calculating the original density level. When the measurement time t2 is short, the time constant of the integrator is decreased. When this measure is taken, AE control can be performed correctly irrespective of the copy size. This operation remains the same as in other copying modes wherein the scanning speed or drum rotation speed are different from those of the case described above.

The quantity to be controlled in accordance with AE measurement can be a developing bias voltage, and the object to be measured for such control need not be the AE latent image potential but may be light from a part of the original.

The AE and other parts of the embodiment of the present invention as described above can be effectively used in an apparatus wherein an image of an original such as a copied object is read by a CCD or the like, and an obtained electrical signal is processed to produce a printed image or transmitted for reproduction at a remote location. In this case, density of the image can be discriminated in accordance with the signal obtained from the CCD.

The time t2 can be determined from a predetermined number of pulses generated in synchronism with the movement of the scanning system or the rotation of the drum, irrespective of the magnification of the reproduced image. The time t1 can also be determined in a similar manner.

When the ADF is used, the optical system can be fixed in position at the inversion sensor 22B, and the latent image can be formed on the photosensitive drum when the original is fed on the platen. The potential of the formed image can then be measured and the density of the image can thus be determined. In this case, a copy of an original with an optimal density can be performed within a shorter period of time.

Figure 9:
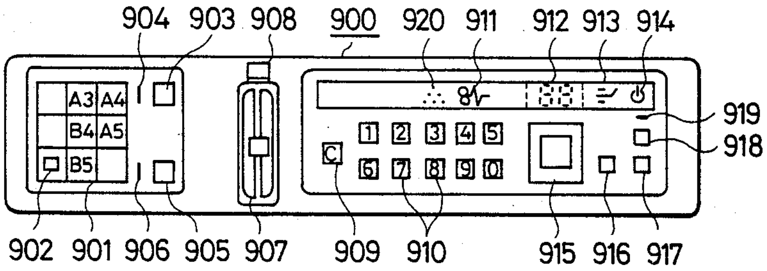
FIG. 9 is a plan view of a console of the apparatus of the present invention.

The original density can be measured, and the result obtained by correcting the measured density in accordance with a parameter such as magnification can be displayed by the display section as shown in FIG. 9. In this case, if the measurement circuit is operated even during the copying operation, the original density can be constantly monitored. If the density is set with the lever 907 in accordance with the monitor result, optimal density can be achieved by manual operation.

The operator's method for performing the above operation will now be described with reference to FIG. 9 showing the console. A control panel 900 has a cassette size display 901, a manual feed indicator 902, upper and lower cassette selection keys 903 and 905, upper and lower cassette selection indicators 904 and 906, a copy density lever 907, an AE selection key 908, a clear key 909, ten key 910, a jam indicator 911, a 7-segment display 912, an interrupt indicator 913, an interrupt selection key 916, a stop key 917, a wait indicator lamp 914, and a power saving selection key or indicator 918.

An interrupt is performed during a continuous copying operation. When the copying machine is operated without the ADF in this case, no important problem is experienced. However, if the ADF is used as in the case described above, a problem may be experienced as in the following case. When copying of a plurality of originals is performed using the ADF, the copy sequence of the copying machine is interrupted and the interrupt state is established when there has been an interrupt copy request and the interrupt selection key 916 is depressed. The original which has been subjected to the copying operation is discharged and stacked at an original discharge section 9, as shown in FIG. 1. On the other hand, the original which has not been subjected to the copying operation remains in the original tray 1. Thus, an interrupt copy is performed in this state. In order not to disturb the page order of the originals after the interrupt, the originals in the tray 1 must not be removed. Accordingly, in the interrupt copying operation, the ADF is preferably prohibited. In this embodiment, in the interrupt operation, the ADF is prohibited, and the operation of the ADF start switch D shown in FIG. 1 is also prohibited.

A power saving mode indicator 919 is formed above the power saving selection key 918. For the sake of saving power, the fixing temperature, e.g., 180° C. is reduced to 150° C., for example. The fixing roller 44 shown in FIG. 1 is of general fixing temperature type.

When the power saving mode is selected as described above, the temperature of the fixing roller 44 is lowered from 180° C. to 150° C. At the same time, the display section of the control panel shown in FIG. 9 is off except for the power saving selection indicator 919, thus contributing to further power savings. However, the power saving selection key 918 cannot be effected all the time. For example, the depression of the power saving selection key 918 is prohibited during a copying cycle. The depression of the power saving selection key 918 is also prohibited during a jam, the warming up after the turning on of the power switch, the warming up after the reset of the power saving mode selection, or the like.

The above means that the power saving selection key 918 can be depressed only when the copying machine is in the standby mode.

The key 918 is an alternate key; it is turned on upon being depressed the first time and is turned off upon being depressed the second time.

The AE selection key 908 normally selects the AE mode. For example, the AE mode is set when the power of the apparatus is turned on. The selection key 908 also serves as an indicator, and is also an alternate key like the power saving selection key 918. When a jam or an error occurs during the copying operation (an error indicates an abnormality in the copying machine; description of the details is omitted), depression of the AE selection key 908 is prohibited. At the inversion time from the forward to the backward movement of the optical system for the final copy to be produced in the continuous interrupt copy operation, the AE selection key 908 is enabled. When the ADF is used, it is enabled upon generation of the signal shown in FIG. 6(*b*), when the last original (not image in this case) is being inverted, during the sheet feed and discharge, and before the optical system is moved in the forward direction for prescanning for AE measurement.

When manual feed is to be performed, the manual feed indicator 902 is turned on. When manual feed is desired, that is, when a copy image is to be reproduced on a postcard or straw paper other than the general transfer sheets in an upper cassette 51 shown in FIG. 1, the postcard or the like is placed on a manual feed guide 54 for performing the copying operation. In this case, a manual feed lever 53 is pivoted downward so that the transfer sheet in the cassette 51 may not be erroneously fed by the pickup roller. A manual feed sensor 55 detects when the manual feed lever 53 is pivoted downward, and the manual feed mode is selected.

When the manual feed mode is selected, the manual feed indicator 902 shown in FIG. 9 is turned on. When the lower cassette is being selected, the lower cassette selection indicator 906 is ON. Even in this case, if the manual feed lever 53 selects manual feed, the indication is automatically switched from the lower cassette selection indicator 906 to the upper cassette selection indicator 904. At the same time, the manual feed indicator 902 is turned on. Similarly, when a switch is made from the lower cassette to the upper cassette, the key inputs of the upper and lower cassette selection keys 903 and 905 are enabled. When the manual feed lever 53 is selected, the manual feed indicator 902 is turned on, and at the same time, the preset copy number "1" is indicated at the 7-segment display 912.

This is because the manual feed is based on individual copy operation. In the manual feed mode, input from the ten keys 910 is prohibited. When the lever 53 is switched to the manual feed side, the preset copy number, whatever the current number is, is switched to 1. When the lever 53 is returned to the original position, inputs by the ten keys 910 are enabled. AE measurement can be performed irrespective of the manual feed or interrupt mode.

In the case of AE measurement in the manual feed mode, when the copy start key is depressed after inserting a sheet which is detected by a sheet detector (not shown), prescanning is performed to detect the original density as in the case of cassette sheets. The sheet is fed manually, and copy scanning is performed to produce a copy. However, even if the copy start key is not depressed, prescanning for AE measurement can be automatically performed and subsequently copy scanning can be performed upon detecting the insertion of the manually fed sheet onto the manual feed guide 54. This allows depression of the copy start key to be omitted.

Assume a case wherein the manual feed guide is set during continuous copying operation on sheets fed from a cassette, the continuous copying operation is interrupted, and the interrupt key is turned on. In this case, interrupt display and interrupt operation can be performed in a similar manner to that described above.

Until the interrupt signal is released or the interrupt copy is completed upon turning of the stop key after depression of the interrupt key, the ADF start key is prohibited. However, when the interrupt key is depressed while the ADF is not being used, the copying operation can be interrupted and the ADF start key is enabled before the preset copy number is completely produced, and the ADF interrupt copy is enabled. In this case, when the interrupt of a preset copy number is completed, general control for returning to the original copy mode before interruption is prohibited until there are no more sheets in the feed section. When there are no more sheets at the feed section, the copying mode is restored to the previous copying mode. Then, the remaining preset copy number before the interruption is displayed, and AE display is performed if the previous mode is AE measurement. If the previous mode is not AE measurement and an interrupt copy key is depressed, (automatic) setting of the preset copy number to 1 does not result in setting of the AE mode. Accordingly, the operability of the copying machine is improved. All the keys including the AE key are not prohibited when there is no paper.

The warm up time described above is the wait time required for the fixing heater to reach the copy start temperature. The standby time also described above is the machine state before and after the drum rotation duration. When the power saving key is depressed, all the power except for the temperature control circuit of the fixing heater and that for a microcomputer to be described later is cut off.

Referring to FIG. 6, before the original scanning of the first original is started, the drum is cleaned by the cleaner, exposed by the lamp 32, and stabilized.

During this operation, the transfer charger 40 is rendered inoperative, and fatigue of the drum is prevented. After the start of original scanning and until the end of scanning of the last original, the chargers are rendered operative. Thereafter, the chargers are rendered inoperative, and the drum is exposed to the uniform potential by the lamp 32. The drum is cleaned and is left to stand. After 2 hours, the main power switch is turned off, and only the microcomputer is kept ON. The same applies when 2 hours pass after turning on of the power supply switch. When the apparatus is left as in the case of a jam, return to the AE or non-AE measurement mode of the preset copy number "1" cannot be performed. However, after 2 hours, the power is turned off, and various displays and indicators are also turned off. Return to non-AE measurement of the preset copy number "1" is a control which is performed after a predetermined period of time (30 sec) after the time at which the main motor was stopped. This return control can be performed in synchronism with the stopping of the drum which is driven by the main motor.

When a copy start key 915 shown in FIG. 9 is depressed, the copying machine enters into the copy sequence. A predetermined period of time is required for the optical system to perform actual exposure after the start of prescanning. When a need to cancel this copy sequence arises during this time period, the copy operation can be stopped by depression of the stop key 917. In other words, the copy operation can be cancelled in steps 701, 702, 703, 704 and 705 before the sheet is fed. However, once sheet feed is started, the transfer sheet is already introduced into the copying machine, and the copying operation can no longer be cancelled. In this case, AE measurement is performed. When the copying operation can be cancelled, the optical system (scanning system) is stopped at the home position 22B and awaits there. After a predetermined period of time, the optical system is returned to the home position 22A as described above. In synchronism with the return of the optical system to the home position 22A, the non-AE measurement mode is set. When the AE measurement mode is released in the waiting mode, the AE display disappears but the optical system remains at the home position 22B. Thus, when the copy start key is depressed, the optical system is returned to the home position 22B. The drum is driven for performing precleaning and preexposure.

Figure 10:
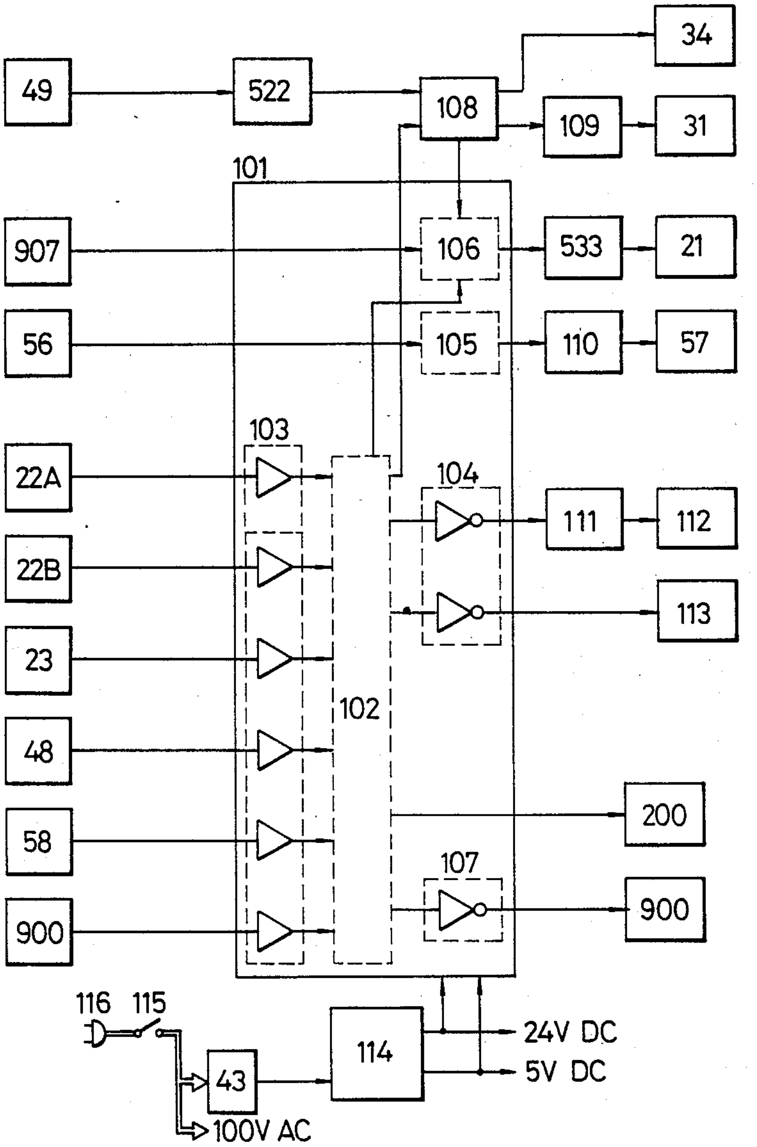
FIG. 10 is a control block diagram of the apparatus of the present invention.

The timing of the operation of the copying machine shown in FIG. 1 has been described. The section for controlling the respective loads of the copying machine will now described. FIG. 10 shows a block diagram of the control section. A microcomputer 102 operates basically ,in accordance with the flow charts shown in FIG. 7-1 through FIG. 7-5. The timing chart of AE measurement is shown in FIG. 6. Referring to FIG. 10, the microcomputer 102 is formed on a control substrate 101. A buffer 103 is for providing input protection, and drivers 104 and 107 are included. A temperature controller 105 controls the temperature of the fixing roller 44 as described above. A driver 110 drives a roller heater 57. When a power supply switch 115 is turned on through a power supply plug 116, the copying machine is set in the waiting mode. This is because the copying operation cannot be performed until the fixing roller reaches a predetermined temperature. This waiting time is generally called the wait up time and a wait up lamp 914 as shown in FIG. 9 is turned on to indicate this. When the power supply switch 115 is turned on, power is supplied to a power supply circuit 114 through the power supply transformer 43. Then, 24 V DC and 5 V DC are applied to the respective loads and the control substrate 101. A DC load 113 is connected to the driver 104, and an AD load 112 is driven by a driver 111. An illumination lamp light amount control section 106 includes the part shown in FIG. 5-1. A potential control circuit 108 calculates in accordance with the measured drum surface potential and controls the corona current flowing to the high-voltage transformer.

The reading including the AE reading is also supplied to the illumination lamp light amount control section 106.

A toner for visualizing the latent image is held in the developer 29, and the contact with the photo-sensitive drum 33 is achieved by means of a developing roller 34.

Development plays a very important role in image formation. Warning lamps are incorporated to warn of erroneous mounting of the developer 29 and deficiency in toner. When the residual toner in the developer 29 is deficient, it is detected by a toner sensor (not shown) and a toner replenishment lamp 920 as shown in FIG. 9 is turned on.

Figure 11:
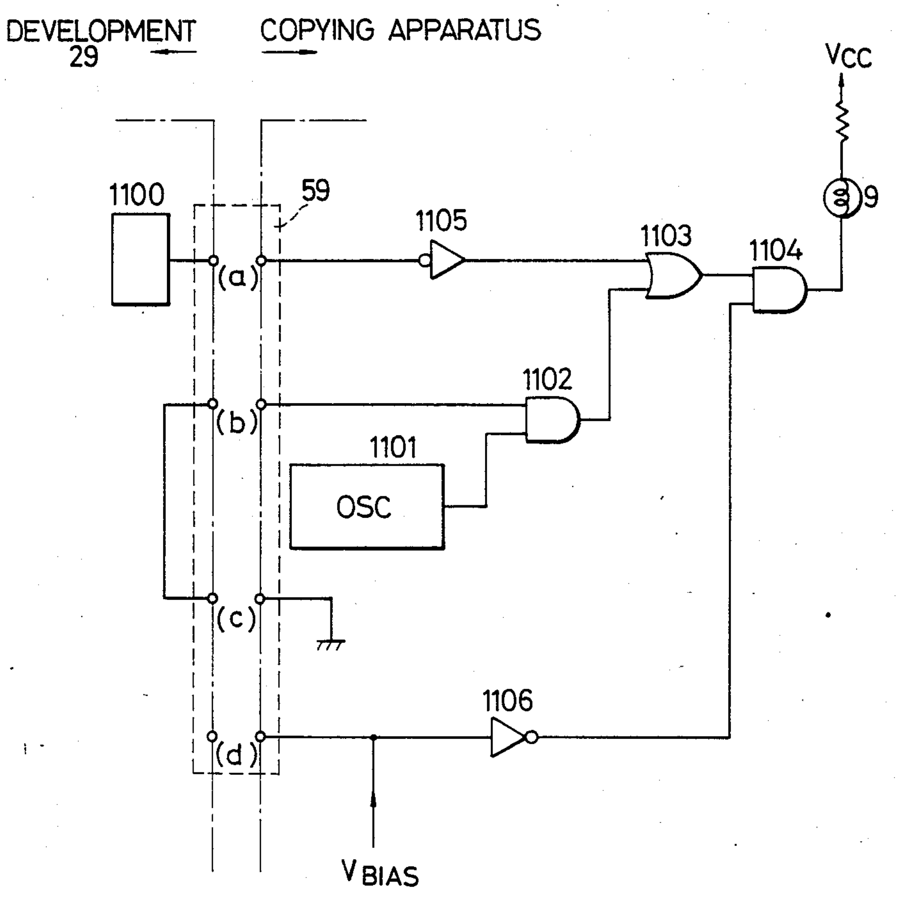
FIG. 11 is a warning circuit of the apparatus of the present invention.

For the mounting/demounting of the developer 29, warning is provided by the circuit shown in FIG. 11.

A deficiency in the toner is detected by toner sensor 1100, signal of "H" level is supplied to an OR circuit from a connector 59 through an inverter 1105. Then, an AND circuit 1104 is turned on, and the toner replenishment lamp 920 is turned on to warn of toner deficiency. In this case, the current copying operation is not stopped, the corresponding developing operation is continued, and subsequent copying operation is prohibited after the reproduction of copies of the preset number until fresh toner is replenished.

When the developer 29 is mounted properly as shown in FIG. 1, the connector 59 is connected. Accordingly, when the developer 29 is not mounted or point (b) or (c) in FIG. 11 is not connected due to an erroneous mounting of the developer 29, a signal of "H" level is supplied to an AND circuit 1102 and a flashing signal is generated in synchronism with the oscillating period of an oscillator 1101. The toner replenishment lamp 920 is flashed to warn of the erroneous mounting of the developer 29 through an OR circuit 1103. In this case, when the flashing operation of the lamp 920 is started, the copying operation is stopped by a circuit (not shown) which stops the rotation of the drum. The copying operation can be resumed only after the developer 29 is properly mounted.

At this time, the toner sensor 1100 is not connected, and output from the inverter 1105 is at "L" level. Accordingly, the logic output from the OR circuit 1103 is not affected.

In this manner, only the toner replenishment lamp 920 can provide a warning against toner deficiency and erroneous mounting of the developer 29, and also allows discrimination between these two conditions. When the developing bias is applied or the developing motor is driven, an AND circuit 1106 is turned on and the warning is prohibited by means of an AND circuit 1104. For this reason, the developing operation will not be interrupted upon detecting a deficiency in the toner or the like, thus resulting in safe operation. When the developer is erroneously mounted, the current copying cycle is completed, and resuming of the copying operation is prohibited until the developer 29 is properly mounted. Thus, jamming of the paper sheet can be prevented. Stopping and resuming the machine can be controlled upon detecting a deficiency in the toner or an erroneous mounting of the developer, so that operability of the machine is improved.

Similar display control to that described above can also be performed with detectors which serve to detect proper mounting of cassettes and the presence/absence of sheets in these cassettes.

What we claim is:

1. An image reproducing apparatus having a driven photosensitive body onto which an image is scanned, comprising:

means for detecting a density of an original image during prescanning of the original image, and for producing a detection signal; and means for controlling an imaging process in accordance with a detection signal from said detecting means, said control means having means for performing an operation in response to a value of said detection signal, means for resetting said performing means prior to a start of an image reproducing operation, means for suspending a said image operation, and means for inhibiting an operation of said resetting means during suspension of a said image reproducing operation, wherein said original image is scanned and said photosensitive body is driven, and wherein an operational constant, associated with integration, of said performing means is changed in accordance with a change in a selected one of a scanning speed of the original image and a drive speed of said photosensitive body.

2. An apparatus according to claim 1, wherein said detection means detects a potential on a photosensitive member wherein said potential corresponds to said light intensity.

3. An apparatus according to claim 1, further comprising means for providing a multiple copy operation wherein the suspension of the image reproducing operation is performed during multiple copy operation.

4. An apparatus according to claim 3, wherein the suspension of the image reproduction operation represents a shortage of consuming material for image reproduction.

5. An apparatus according to claim 1, wherein said control means controls a drive speed of said photosensitive body in accordance with an image reproduction magnification.

6. An apparatus according to claim 1, wherein said control means controls a density of a reproduced image in accordance with an output from said performing means.

7. An apparatus according to claim 6, further comprising development means for forming a developed image on said photosensitive body, wherein said control means controls a voltage supplied to said development means.

8. An apparatus according to claim 1, further comprising memory means for storing an output from said performing means, wherein said reset means resets said memory means.

9. An apparatus according to claim 8, wherein said memory means stores a peak value of an output from said performing means.

10. An apparatus according to claim 1, wherein said control means controls a time of detection of an original density by said detecting means, in accordance with a drive speed of said photosensitive body.

11. An apparatus according to claim 1, further comprising means for receiving a signal for stopping the image process, wherein said control means stops the image process without image reproduction if said receiving means receives said signal before completion of pre-scanning.

12. An apparatus according to claim 11, further comprising feed means for feeding a sheet on which an image is reproduced, wherein said control means stops the image process without image reproduction if said receive means receives the signal before the start of said feed means after the start of the pre-scanning.

13. A document scanning apparatus, including means for exposing an original image, comprising:

means for detecting a density of an original image, and for producing a detection signal;

means for reproducing an image in accordance with a detection signal from said detecting means;

means for feeding an original to an illumination position;

a movable member for scanning the original image at said illumination position;

first selecting means for selecting a mode in which said detection means is activated;

second selecting means for selecting a mode in which said feeding means is activated; and means for selectively setting an initial position for density level detection of said movable member in accordance with selections by said first and second selection means.

14. An apparatus according to claim 13, further comprising means for prescanning said original image, and for switching a light amount of said original image exposing means during scanning of the original image, from a light amount during prescanning to a preset light amount.

15. An apparatus according to claim 13, wherein said detection means detects a potential on a photosensitive member wherein said potential corresponds to a light intensity.

16. An apparatus according to claim 13, wherein said reproducing means includes means for controlling a density of a reproduced image on the basis of an output from said detecting means.

17. An apparatus according to claim 16, further comprising development means for forming a reproduced image based on the image of the original.

18. A document scanning apparatus comprising:

reciprocating means for scanning an image of an original;

illuminating means for intermittently exposing the original;

first control means for controlling a scan distance of said reciprocating means; and second control means adapted to turn off said illuminating means after the end of illumination of the original and to control a timing for turning on said illuminating means in a next scanning cycle in accordance with a movement distance of said reciprocating means, wherein said second control means includes count means for counting a time period after the end of forward movement of said reciprocating means, and turns on said illuminating means when said count means has counted a value corresponding to said movement distance.

19. An apparatus according to claim 18, wherein said second control means controls a next cycle start timing of said illuminating means during multi-copying.

20. An apparatus according to claim 18, further comprising means for forming an image on a recording material, wherein said first control means controls a scan distance in accordance with a size of the recording material.

21. An apparatus according to claim 20, wherein said second control means turns on said illuminating means before the end of backward movement of said reciprocating means.

22. An image reproducing apparatus comprising:

means for scanning an original;

means for reproducing an image corresponding to the original;

means for issuing a command for interrupting an operation of said reproducing means; and means for controlling said reproducing means to interrupt its operation before completion of one scanning operation of the original for image reproduction when the command is issued during a predetermined period after a start of scanning of the original, wherein said wherein said image reproducing means includes means for detecting a density of an original by pre-scanning the original to generate an automatic exposure signal, and said control means performs its operation when the command is issued during the period of time after a start of the pre-scanning.

23. An apparatus according to claim 22, further comprising means for feeding a sheet on which an image is reproduced, wherein said control means performs its operation when the command is issued during the period of time from the start of scanning of the original to a start of feeding the sheet.

24. An image reproducing apparatus having a driven photosensitive body onto which an image is scanned, comprising:

means for forming an image on said photosensitive body;

means for selecting a magnification for image formation;

means for scanning an original at a speed corresponding to a magnification selected by said selecting means;

means for driving said photosensitive body at a speed corresponding to a magnification selected by said selecting means; and means for detecting an original density level by scanning an original with said scanning means, said detecting means changing a parameter for calculating said original density level in accordance with a scanning speed of said scanning means and a drive speed of said drive means.

25. An apparatus according to claim 24, wherein said detection means detects a potential on a photosensitive member, wherein said potential corresponds to a light intensity.

26. An apparatus according to claim 24, further comprising control means for controlling a density of a reproduced image in accordance with an output from said detecting means.

27. An apparatus according to claim 26, wherein said control means controls a time of detection of an original density by said detecting means, in accordance with a drive speed of said photosensitive body.

28. An image reproducing apparatus comprising:

means for scanning an original;

means for reproducing an image corresponding to the original;

means for inputting a command for starting image formation;

means for issuing an interruption command for interrupting an operation of said reproducing means, and means for controlling said reproducing means to interrupt its operation before completion of one scanning operation of the original for image reproduction when the interruption command is issued during a predetermined period after the entry of said start command, wherein said image reproducing means includes means for detecting a density of an original by pre-scanning the original to generate an automatic exposure signal, and said control means performs its operation when the interruption command is issued during the predetermined period of time after a start of the pre-scanning.

29. An apparatus according to claim 28, further comprising means for feeding a sheet on which an image is reproduced, wherein said control means performs its operation when the command is issued during the period of time from the start of scanning of the original to a start of feeding the sheet.

* * * * *